United States Patent
Lipp et al.

(10) Patent No.: US 7,065,374 B2
(45) Date of Patent: Jun. 20, 2006

(54) TRANSMITTER AND RECEIVER DEVICE AND METHOD FOR SYNCHRONIZING A RECEIVER INSTALLATION

(75) Inventors: Friedrich Lipp, Hof bei (AT); Rolf Eppinger, Munich (DE)

(73) Assignee: Rohde & Schwarz GmbH & Co., KG, Munich (DE)

( * ) Notice: Subject to any disclaimer, the term of this patent is extended or adjusted under 35 U.S.C. 154(b) by 577 days.

(21) Appl. No.: 10/276,040

(22) PCT Filed: May 2, 2001

(86) PCT No.: PCT/EP01/04919

§ 371 (c)(1),
(2), (4) Date: Nov. 11, 2002

(87) PCT Pub. No.: WO01/86835

PCT Pub. Date: Nov. 15, 2001

(65) Prior Publication Data

US 2003/0176168 A1    Sep. 18, 2003

(30) Foreign Application Priority Data

May 11, 2000  (DE)  ................................ 100 23 007

(51) Int. Cl.
H04B 7/01      (2006.01)
H04J 3/06      (2006.01)
H04L 7/00      (2006.01)

(52) U.S. Cl. ..................... 455/502; 455/13.2; 370/350; 370/503; 375/354; 375/355

(58) Field of Classification Search ................ 455/502, 455/69, 230, 231, 13.2, 574, 70; 370/304, 370/324, 350, 395.62, 503, 507, 509, 510, 370/520; 375/354–356, 358, 359
See application file for complete search history.

(56) References Cited

U.S. PATENT DOCUMENTS 5,319,374 A    6/1994  Desai et al.

FOREIGN PATENT DOCUMENTS

EP    0 704 991 A1    3/1996

(Continued)

OTHER PUBLICATIONS

Akos, D M et al: "Receiver Measured Time in the VDL Mode 4 System", IEEE 2000 Position Location and NAvigation Symposium (Plans 2000) San Diego, CA, Mar. 13-16, 2000, Position Location and Navigation Symposium, NY, NY, Mar. 13, 2000, pp. 309-316, XP-000991428.

(Continued)

*Primary Examiner*—Doris H. To
*Assistant Examiner*—Eugene Yun
(74) *Attorney, Agent, or Firm*—Lewis, Rice & Fingersh, L.C.

(57) ABSTRACT

The invention relates to a transmitter and receiver device (1) for a cellular radio network, comprising a transmitter installation (6a) and a receiver installation (8a) located at a spatial distance to said transmitter installation (6areceiver (7) is connected to said transmitter installation (6a) and time-controls the transmission of transmission blocks by the installation (6a). The receiver installation (8a) is not provided with a time standard receiver. Instead, the receiver instal (8a), by intercepting the transmission signal emitted by the transmitter installation (6a) located in the same cell, generate signal for synchronizing the time of a timer of the receiver installation (8a).

26 Claims, 3 Drawing Sheets

FOREIGN PATENT DOCUMENTS

EP            0 954 122 A1     3/1999

OTHER PUBLICATIONS

Figure 1:
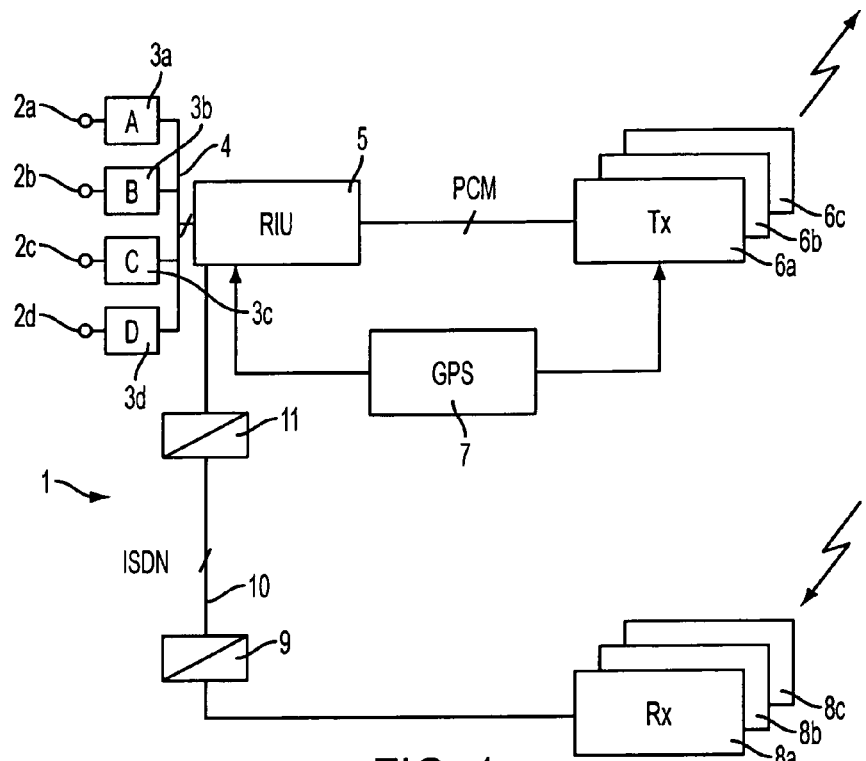

Hershey, J E: "Notes on ADS-B, The Function and Its Proposed Implementations", 98CRD181, Dec. 16, 1998, GE Research and Development.

Kjellberg, Rikard, "Capacity and Throughput using a Self Organized Time Division Multiple Access VHF Data Link in Surveillance Applications", Master Theisis, Departemnt of Computer and System Sciences, University of Stockholm and The Royal Institute of Technology, Stockholm, Sweden, GP&C Sweden AB, Apr. 1998.

List of Working Papers for AMCP WG D/9 (Ottawa) (Sep. 22-Oct. 1, 1998) printed from http://www.faa.gov/nextgen/standard/icao/wgd9/wgd9.htm and Draft of VHF Digital Link (VDL), TDMA Mode (Mode 3) Version 1.6a, Standards and Recommendationed Practices, Jul. 1998.

Akos, Dennis M., et al.. Receiver Measured Time in the VDL Mode 4 System. Lulea University of Technology, 2000. 309-316 Kjellberg, Rikard. Capacity and Throughput Using a Self Organized Time Division Multiple Access VHF Data Link in Surveillance Applications. Dept. of Computer and System Sciences and The Royal Institute of Technology. Sweden, 1998.

Federal Aviation Administration. List of Working Papers for AMCP WG D/9. Ottawa, 1998 Hersey, J.E.. Notes on ADS-B The Function and its Proposed Implementations. GE Research & Development Center 1998.

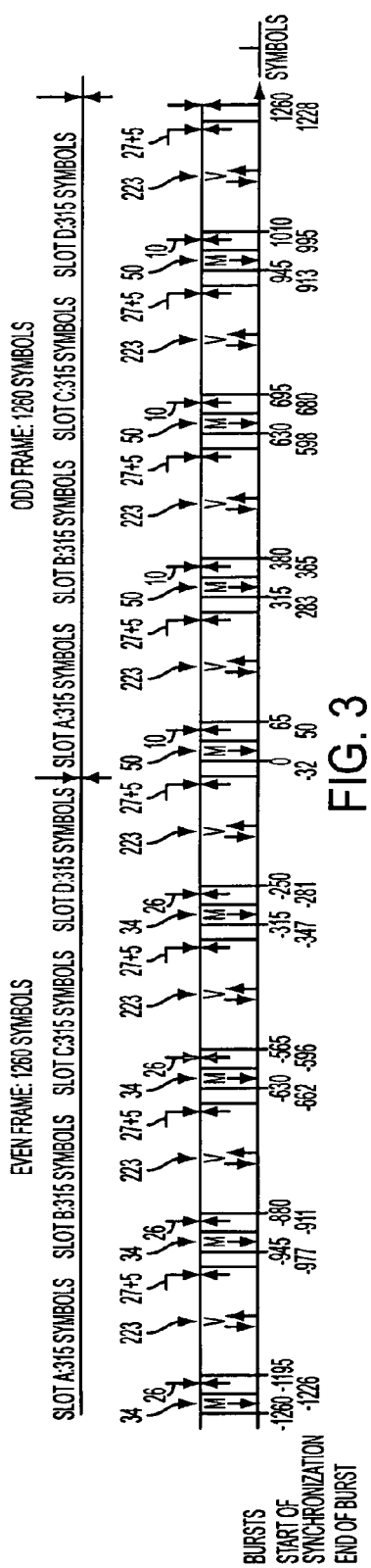
FIG. 3
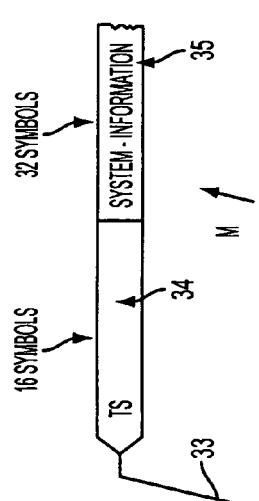
FIG. 4A
FIG. 4B
FIG. 4C

| OCTET NO. | FIRST BIT TRANSMITTED | | | | BIT NUMBER | | | |
|---|---|---|---|---|---|---|---|---|
| | 1 | 2 | 3 | 4 | 5 | 6 | 7 | 8 |
| 1 | MESSAGE ID | | | | VOICE SIGNAL | | AIRCRAFT ID (POLL) | |
| 2 | AIRCRAFT ID (POLL) (CONT) | | | | SYSTEM CONFIGURATION | | | |
| 3 | SLOT ID | | | GROUND STATION CODE | | | SQUELCH WINDOW | |
| 4 | (MESSAGE DEPENDENT) | | | | | | | |
| 5 | | | | | | | | |
| 6 | | | | | | | | |

FIG. 5  ↖ 35

TRANSMITTER AND RECEIVER DEVICE AND METHOD FOR SYNCHRONIZING A RECEIVER INSTALLATION

The invention relates to a transmitter and receiver device for a cellular radio network and particularly for a radio network for VDL (VHF digital link) aeronautical radio. Aeronautical radio transmitter and receiver devices of this kind are used for digital speech transmission and the transmission of other digital data between a ground station and mobile stations situated in aircraft. The method also relates to a method for synchronizing the receiver device.

In transmitter and receiver devices for VDL aeronautical radio, the receiver installation is located some distance away from the transmitter installation, for decoupling reasons, and is connected to the transmitter installation by a hard-wired line. The problem that then exists is that the transmitter installation and the receiver installation have to be synchronized. In principle this can be done by providing a time-standard receiver both at the location of the transmitter installation and at the location of the receiver installation. It is however uneconomical for a second time-standard receiver to be provided.

It is an object of the present invention to specify a transmitter and receiver device, and a method for synchronizing a receiver installation that makes easy synchronization possible between the receiver installation and the transmitter installation.

With respect to the transmitter and receiver device this object is achieved by virtue of the features detailed in claim 1 and with respect to the method by virtue of the features detailed in claim 11.

The finding underlying the invention is that it is enough for a time-standard receiver to be provided only at the location of the transmitter device. The synchronization of the receiver installation to the transmitter installation is accomplished by listening in on the transmission signal from the transmitter installation located in the same cell of the cellular radio network.

Claims 2 to 10 relate to advantageous refinements of the transmitter and receiver device according to the invention. Claims 12 and 13 relate to advantageous refinements of the method according to the invention.

The synchronizing signal is preferably only generated from the transmission signal that is listened in on when the associated transmission burst is introduced by a predetermined training sequence. Transfer of the time at the first timer (background timer) to a second timer (foreground timer) preferably only takes place when, in addition, at least one bit of a set of system information following the training sequence is of a predetermined value. As well as the coincidence between the training sequence and the system information, it is also possible for the field strength and/or the error rate of the signal that is listened in on to be analyzed. If the field strength is too low, it can be assumed that the signal being listened in on does not come from the same cell but from a neighboring cell. If the signal being listened in on is not free of errors or the error rate is too high, it is rejected in the same way.

The synchronizing signal generated by listening in on the transmission signal can be used in this case firstly to set the time of a background timer. The time at the background timer is only transferred to a foreground timer when the criteria described above are met. A check can also be made to see whether the difference in time between the background timer and the foreground timer is less than a maximum difference in time that is expected as a result of the possible drift of the oscillator (clock signal generator) driving the two timers. Because this drift depends on when the time at the foreground timer was last updated by a transfer of the time at the background timer, the maximum permitted difference in time is time-dependent.

Figure 2:
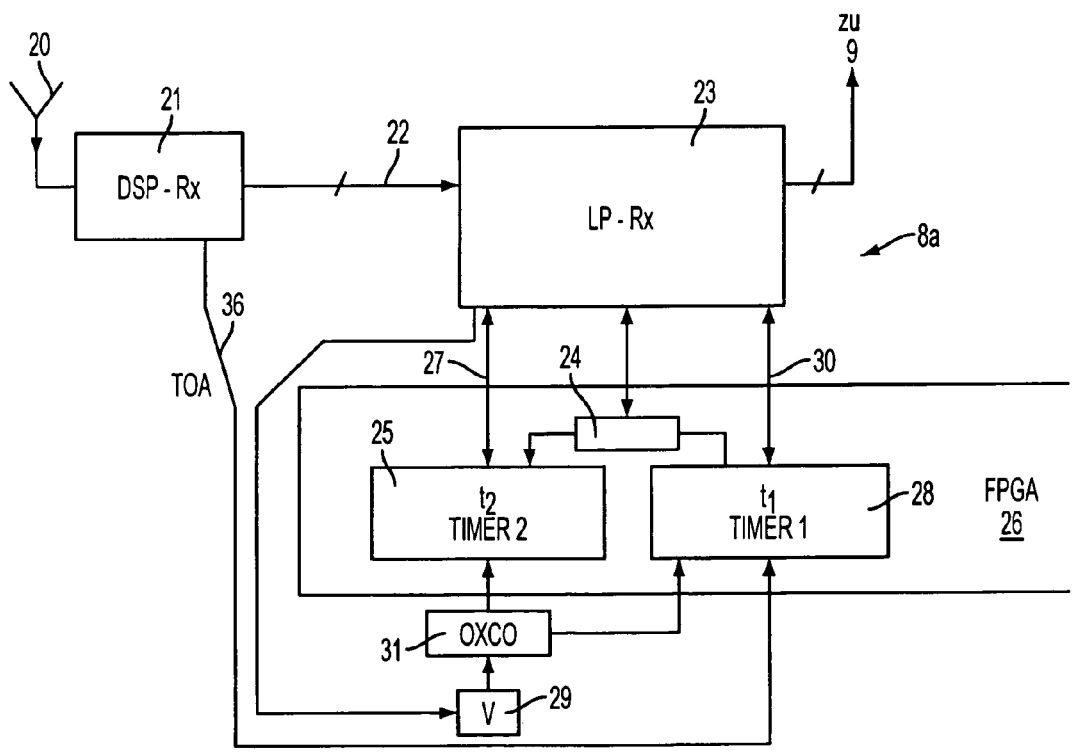
Figure 6:
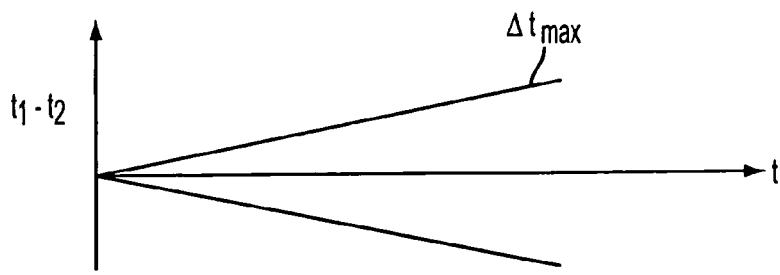

An embodiment of the invention is described in detail below by reference to the drawings. In the drawings:

FIG. 1 is a block circuit diagram of a transmitter and receiver device for VDL aeronautical radio, FIG. 2 is a detailed block circuit diagram of the receiver installation, FIG. 3 is a diagram to elucidate the transmission and reception bursts, FIGS. 4A–4C are diagrams to elucidate the structure of the data in the transmission signal and the generation of a control signal, FIG. 5 is a diagram to elucidate the structure of the system information in the transmission signal, and FIG. 6 is a diagram to elucidate the maximum permitted time difference.

FIG. 1 is a schematic block circuit diagram of a transmitter and receiver device 1 that can be used in particular for VDL (VHF digital link) aeronautical radio. The individual operators, such as air traffic controllers for example, are connected to the speech data inputs or outputs 2a, 2b, 2c, 2d by microphones and head-phones (not shown) and amplifiers or analog/digital converters (not shown), which means that the speech data inputs 2a–2d receive packets of digital speech data. In the embodiment shown there are a total of four speech data inputs 2a–2d that are assigned to four slots A, B, C and D. Slots A, B, C, D have respective vocoders 3a, 3b, 3c, 3d. In vocoders 3a–3d, the speech data is compressed and redundant data removed. The compressed data packets are fed via a data bus 4 to a central control unit 5 that is generally referred to as an RIU (radio interface unit). Control unit RIU 5 is connected via a PCM (pulse code modulation) data bus to a plurality of transmitter installations Tx 6a, 6b, 6c that emit transmission bursts configured in a specified way at set times. A time-standard receiver 7, such as a receiver for the GPS system for example, is connected both to control unit RIU 5 and to transmitter installations 6a–6c.

For decoupling purposes, a plurality of receiver installations Rx 8a, 8b, 8c are located some distance away from the transmitter installations 6a–6c and are connected via a data converter 9 to a data line 10 that in turn is connected via a data converter 11 to control unit RIU 5. The data line 10 may for example be a plurality of ISDN telephone lines.

The VDL aeronautical radio network is a cellular radio network, of which only the transmitter and receiver device 1 of a single cell is shown in FIG. 1. The emission of the transmission bursts takes place in a fixed TDMA time frame. It is therefore necessary not only for the emission of the transmission bursts by the transmitter installations 6a–6c be synchronized in time but also for the receiver installations 8a–8c to be synchronized so that the receiver installations 8a–8c can check to see whether the transmission bursts received are within a permitted window of time that is preset by the maximum delay for propagation to an aircraft situated on the edge of the cell. Signals from aircraft outside the cell can be blanked out in this way (by a squelch window or validity window function). In principle the receiver installations 8a–8c could be synchronized by an additional time-standard receiver that was arranged at the location of the receiver installations 8a–8c. This however would be a relatively cost-intensive solution. In accordance with the invention it is therefore proposed that the synchronization of the receiver installations 8a–8c be performed by listening in on the transmission signal from transmitter installations 6a–6c.

FIG. 2 is a detailed block circuit diagram of a receiver installation 8a. The antenna 20 of receiver installation 8a is connected to a digital signal processor (DSP-Rx) 21. The demodulation of the data takes place in digital signal processor 21. The data is passed via an SSI data bus 22 to a link processor LP-Rx. Decoding, and particularly Golay decoding, descrambling and analysis of a set of so-called system information, which will be looked at later on, take place in link processor 23. For this purpose, link processor 23 is connected to an FPGA timing control processor 26 whose first timer 28 is supplied with a synchronizing signal TOA via a line 36. In the preferred embodiment shown in FIG. 2, the first timer 28 operates as a background timer and is connected to link processor 23 via a control line 30. Also provided in the case of the preferred embodiment is a second timer 25 that operates as a foreground timer and is connected to the first timer 28 by a time transfer controller 24. The second timer 25 is connected to link processor 23 by a control line 27.

Timers 25, 28 receive clock signals from a clock signal generator 31 that, in the embodiment shown, is actively temperature-compensated by a heating device (an OXCO—oven controlled constant oscillator).

Before looking more closely at the mode of operation according to the invention, the structure of the bursts in the VDL signals will first be briefly elucidated by reference to FIG. 3. FIG. 3 shows, as a function of time t, the transmission bursts that are usually used in VDL aeronautical radio, the time axis being scaled with the number of data symbols transmitted. Data frames each comprising 1260 symbols break down into four so-called management burst M and four data bursts V. The arrow shown for each burst indicates the direction of transmission. An upward-pointing arrow indicates a transmission from the ground station to the station situated on the aircraft. Conversely, a downward-pointing arrow indicates a transmission from the station on the aircraft to the ground station shown in FIG. 1. Depending on the situation, the data bursts V can be transmitted in both directions. The synchronization of timer 25 described below that is accomplished by listening in on the transmission signal is performed by reference to the management bursts (M) emitted by transmitter installation 6a. In a TDMA time frame, the emission of these management bursts (M) that are transmitted from the ground station to aircraft takes place at precisely fixed times that are synchronized by time-standard receiver 7. The point in time at which these management bursts (M) are emitted can therefore be used to synchronize the timing control processor 26 of the transmitter installation 8a–8c that is transmitted a physical distance away. It is however necessary for this purpose for the management bursts transmitted from the ground station to the aircraft (M's with upward-pointing arrows in FIG. 3) to be distinguished from those transmitted from the transmitter/receivers on the aircraft (M's with downward-pointing arrows in FIG. 3). For this purpose, the present invention makes use of a combination of identifying features that will be explained in detail below.

FIG. 4 shows the structure of the data in the management bursts as a function of time t. Followed by the rising edge 23 of management burst M, which edge is only shown schematically, transmitter installation 6a emits a so-called training sequence TS 34. What is used in this case by the ground station is one specific training sequence $S_2^*$ from a total of four possible training sequences $S_1$, $S_2$, $S_1^*$ and $S_2^*$. However, as a criterion this specific training sequence $TS=S_2^*$ is not yet unambiguous, because in certain operating situations (logging-on, poll response and net entry) this training sequence $S_2^*$ is also used by the mobile transmitter/receivers situated on the aircraft. It is therefore necessary for the criterion of the specific training sequence $S_2^*$ to be combined with a further criterion. In accordance with the solution according to the invention, the set of system information ("System-Info") 35 following the training sequence comprising 16 symbols, which information comprises 32 symbols, is used to provide this additional criterion. This "System-Info" too is shown in FIG. 4A. In FIG. 4B the transmission signal S is shown schematically as a function of time t. As soon as the specific training sequence $S_2^*$ is recognized, there is a change in the state of a synchronizing signal TOA that, as shown in FIG. 2, is fed to the first timer 28 via a control line 36.

FIG. 5 shows the structure of the data forming the system information 35. It can be seen that a so-called message ID is transmitted first and that this is followed by a voice signal, an aircraft ID, a system configuration, a slot ID, a ground station code and message-dependent information. In accordance with the invention it is proposed that certain bits of the system information 35 be used to unambiguously identify a management burst emitted by the ground station. As a particular preference, what may be used is the "Message ID" emitted at the start of the system information 35 because the first bit of this "Message ID" in a management burst emitted by the ground station, or in other words one, 6a, 6b or 6c, of the transmitter installations, is 0, whereas a "Message ID" that is emitted by a mobile transmitter installation situated on an aircraft has a "Message ID" whose first bit is 1.

A different or an additional possibility is to identify the ground station code, which is used only by the ground station. Identifying this ground station code has the added advantage that a management burst that is received from a ground station in another cell of the cellular radio system due to excess-range reception can be disregarded because the transmitter installations 6a–6c in different cells emit different ground station codes.

A different or an additional possible way of disregarding management bursts that are emitted by ground stations in other cells is to check the field strength. For this purpose, digital signal processor 21 transmits to link processor 23 a digital check signal RSSI that corresponds to this field strength. Only if the field strength exceeds a predetermined minimum value will the management burst received be used for time synchronization. A further possibility is for use to be made of the error rate at the time of decoding. Link processor 23 performs a decoding operation, preferably a Golay decoding operation, on the received signal. The error rate FEC is detected when this is done. Only if the error rate is below a predetermined maximal value can it be assumed that the signal has been satisfactorily received and in particular that a management burst from the ground station in a neighboring cell has not been received, which would be disrupted accordingly and would therefore have a higher error rate. In a preferred embodiment it is only an error-free signal that is accepted. Preferably the criteria of training sequence $S_2^*$, first bit of message ID=0, field strength signal RSSI exceeds a preset minimum value and error rate FEC is lower than a predetermined value are used in combination and where necessary are correlated with the additional criterion of correct ground station code.

In the embodiment, it is determined in digital signal processor 21 whether the specific training sequence $S_2^*$ is transmitted by the management burst M listened in on. If it is, the synchronizing signal TOA is transmitted via control line 36 to first timer 28. The first timer is started by the synchronizing signal TOA received. If link processor 23 also finds that the first bit of the message ID is 0, then it decides that what is present is a management burst M emitted by the ground station and it synchronizes to this management burst M by giving time transfer controller 24 a command to transfer the time $t_1$ (or the count) at first timer 28 to second timer 25. If required the additional criteria of field strength, error rate and ground station code are also looked at.

Whereas second timer 25 is responsible for timing link processor 23, the first timer 28 is in background. If a valid training sequence $S_2^*$ is received, it is initially only this background timer 28 that is re-started by synchronizing signal TOA.

Link processor 23 checks, e.g. by analyzing the message ID, whether a valid management burst is present. Only then is the time $t_1$ at first timer 28 transferred to second timer 25. Before the transfer to second timer 25, further management bursts M that are valid by the criteria described above may be analyzed. If it is found that synchronization to these valid management bursts gives the same time for background timer 28 each time and that the synchronization to the management bursts is thus stable, then the time at the first timer 28, that is operating as the background timer, is transferred to the second timer 25 that is operating as the foreground timer.

FIG. 6 is a diagram in which the difference in time between the time $t_2$ at second timer 25 and the time $t_1$ at first timer 28 is shown as a function of time since the last transfer from first timer 28. This difference in time $t_1-t_2$ between the current time $t_2$ at foreground timer 25 and the time $t_1$ to be transferred from background timer 28 can be used as a criterion for the transfer of time $t_1$ from background timer 28 to foreground timer 25. The time $t_1$ at first timer 28 is only transferred to first timer 25 when the difference in time $t_1-t_2$ between the current time $t_2$ at second timer 25 and the time $t_1$ to be transferred at first timer 28 is less than a maximum difference in time $\Delta t_{max}$. This maximum difference in time increases as a function of the time t that has elapsed since the last transfer from first timer 28 to second timer 25, linearly for example.

The difference in time $t_1-t_2$ may also be used to slave clock signal generator 31 is such a way that the difference in time $t_1-t_2$ becomes as small as possible. For this purpose, clock signal generator 31 may take the form of a voltage-controllable constant oscillator (VXCO) and may be connected to a voltage source 29. Link processor 23 then controls this voltage source 29 in such a way that the clock frequency from clock signal generator 31 is slaved so that the difference in time between the time $t_1$ at first timer 25 and the time $t_2$ at second timer 28 is as small as possible at each transfer.

If, as shown in FIG. 3, a plurality of management bursts M are transmitted by the ground station to the mobile transmitter/receivers on the aircraft at different times within a data frame and in relation to different slots A–D (slot A, slot B, slot C, slot D), then for synchronization to the time of reception of these management blocks M allowance must of course also be made for the different times of transmission of these management bursts M which arise due to the shift of 315 symbols at a time from slot to slot. By analyzing the slot ID shown in FIG. 5 it is possible to find the slot (slot A, slot B, slot C, slot D) to which the given management burst M belongs and to correct this temporal shift by calculation.

The invention is not limited to the embodiment shown. The idea behind the invention of listening in on the transmission signal from the transmitter installation in the same cell for the purpose of synchronizing the receiver installation can be applied in a vast number of actual embodiments and not just in VDL aeronautical radio.

The invention claimed is:
1. A cellular radio network comprising:
at least one transmitter installation capable of transmitting transmission bursts to a mobile station, said transmitter installation including a time-standard receiver for receiving timing signals, said time standard receiver being capable of controlling the timing of said transmission bursts; and
a receiver installation located a physical distance away from said transmitter installation and being capable of receiving transmissions from said mobile station, said receiver installation not including a time-standard receiver;
wherein said receiver installation listens in on a transmission burst from one of said at least one transmitter installation;
wherein said receiver installation determines if said one of said transmitter installations is located in the same cell of said cellular radio network as said receiver installation; and
wherein said receiver installation generates a synchronizing signal for synchronizing a time at a first timer in said receiver installation with said timing signals based on said transmission burst if said one of said at least one transmitter installation is located in the same cell as said receiver installation.

2. The network of claim 1 wherein said synchronizing signal is only generated when said transmission burst is introduced by a predetermined training sequence.

3. The network of claim 2 wherein said time at said first timer is transferred to a second timer that controls the timing of the receiver installation only if at least one bit of a set of system information following said training sequence is of a predetermined value.

4. The network of claim 3 wherein said time at said first timer is only transferred to said second timer if a field strength of said transmission burst exceeds a predetermined minimum value.

5. The network of claim 4 wherein said time at said first timer is oniy transferred to said second timer if an error rate of said transmission burst is lower than a predetermined maximum value.

6. The network of claim 4 wherein said time at said first timer is only transferred to said second timer if said time at said first timer differs from said time at said second timer by less than a predetermined maximum difference in time.

7. The network of claim 6 wherein said predetermined maximum difference in time increases as a function of the time that has elapsed since the last transfer from said first timer to said second timer.

8. The network of claim 3 wherein said time at said first timer is only transferred to said second timer if an error rate of said transmission burst is lower than a predetermined maximum value.

9. The network of claim 8 wherein said time at said first timer is only transferred to said second timer if said time at said first timer differs from said time at said second timer by less than a predetermined maximum difference in time.

10. The network of claim 9 wherein said predetermined maximum difference in time increases as a function of the time that has elapsed since the last transfer from said first timer to said second timer.

11. The network of claim 3 wherein said time at said first timer is only transferred to said second timer if said time at said first timer differs from said time at said second timer by less than a predetermined maximum difference in time.

12. The network of claim 3 further comprising:
a time-transfer controller arranged between said first timer and said second timer that transmits said time at said first timer to said second timer.

13. The network of claim 3 wherein the receiver installation includes a signal processor that finds whether said predetermined training sequence has been transmitted, and a link processor connected downstream of the signal processor that finds whether the system information is of said predetermined value.

14. The network of claim 13 wherein the signal processor transmits said synchronizing signal to said first timer if said signal processor finds that said predetermined training sequence has been transmitted.

15. The network of claim 14 wherein said time at said first timer is only transferred to said second timer if a field strength of said transmission burst exceeds a predetermined minimum value.

16. The network of claim 14 wherein said time at said first timer is only transferred to said second timer if an error rate of said transmission burst is lower than a predetermined maximum value.

17. The network of claim 14 wherein said time at said first timer is only transferred to said second timer if said time at said first timer differs from said time at said second timer by less than a predetermined maximum difference in time.

18. The network of claim 17 wherein said predetermined maximum difference in time increases as a function of the time that has elapsed since the last transfer from said first timer to said second timer.

19. The network of claim 13 wherein said time at said first timer is only transferred to said second timer if a field strength of said transmission burst exceeds a predetermined minimum value.

20. The network of claim 13 wherein said time at said first timer is only transferred to said second timer if said time at said first timer differs from said time at said second timer by less than a predetermined maximum difference in time.

21. The network of claim 20 wherein said predetermined maximum difference in time increases as a function of the time that has elapsed since the last transfer from said first timer to said second timer.

22. The network of claim 13 wherein said time at said first timer is only transferred to said second timer if an error rate of said transmission burst is lower than a predetermined maximum value.

23. A method for synchronizing a receiver installation that is part of a cellular radio network with a transmitter installation located in the same cell, the method comprising:
having said transmitter installation generate a transmission signal to a mobile station, said transmission signal comprising a plurality of transmission bursts;
having said receiver installation listen in on said transmission signal;
if said transmitter installation is in the same cell as said receiver installation; and
if a transmission burst in said transmission signal is introduced by a predetermined training sequence, generating a synchronizing signal for synchronizing a time at a first timer at said receiver installation to said transmitter installation; and
if at least one bit of a set of system information following the training sequence is of a predetermined value; transferring said time at said first timer to a second timer to synchronize said receiver installation with said transmitter installation.

24. The method of claim 23 wherein said time at said first timer is only transferred to said second timer if a field strength of said transmission signal also exceeds a predetermined minimum value.

25. The method of claim 23 wherein said time at said first timer is only transferred to said second timer if an error rate of the transmission signal is also less than a predetermined maximum value.

26. The method of claim 24 wherein said time at said first timer is only transferred to said second timer if an error rate of said transmission signal is also less than a predetermined maximum value.

* * * * *